April 12, 1932. C. B. COTTRELL, 3D  1,853,663
DEVICE FOR MAINTAINING RELATIVE MOTOR SPEEDS
Filed July 3, 1929
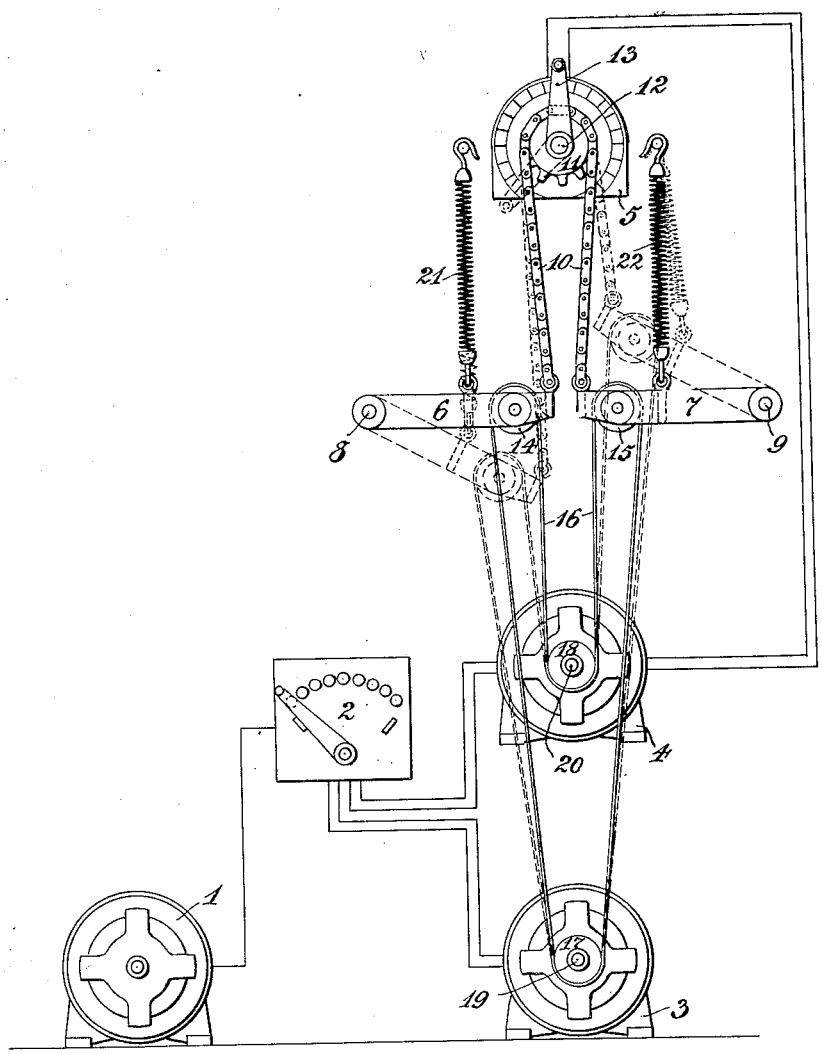
INVENTOR
BY
ATTORNEYS Patented Apr. 12, 1932

1,853,663

UNITED STATES PATENT OFFICE

CALVERT B. COTTRELL, 3D, OF WESTERLY, RHODE ISLAND, ASSIGNOR TO C. B. COTTRELL & SONS COMPANY, OF WESTERLY, RHODE ISLAND, A CORPORATION OF DELAWARE

DEVICE FOR MAINTAINING RELATIVE MOTOR SPEEDS

Application filed July 3, 1929. Serial No. 375,827.

The object of my invention is to provide a novel device whereby the "running ahead" or "running behind" of an auxiliary motor with respect to a master motor may be automatically corrected, to bring the auxiliary motor back into its desired relative speed with respect to the master motor.

A diagrammatic illustration of one embodiment of my invention is represented in the accompanying drawing in which the motor-generator is denoted by 1, its manually operated voltage control by 2, the master motor by 3, the auxiliary motor by 4 and the automatically controlled rheostat by 5, which rheostat in turn controls the speed of the auxiliary motor 4 through the usual electric connections in the well known manner.

These motors obtain their current from the motor-generator 1 and the varying speeds are obtained by the voltage control of the generator.

In the present instance the rheostat 5 is shown as located over the auxiliary motor 4 and the auxiliary motor 4 is located over the master motor 3. A pair of horizontally disposed rock levers 6 and 7 are located between the auxiliary motor 4 and rheostat 5, said levers being pivoted at 8 and 9 respectively, to any suitable support, not shown. A sprocket chain 10 is shown as leading upwardly from the free end of one rock lever and around a sprocket wheel 11 on the shaft 12 of the rheostat arm 13 and from thence downwardly to the free end of the other rock lever, whereby the rheostat arm 13 is moved along its contacts in one or the other direction from its neutral position by the upward or downward movement of one of the rock levers and the corresponding downward or upward movement of the other rock lever.

These rock levers are shown as carrying pulleys 14 and 15. An endless belt 16 passes around these pulleys as well as around the motor pulleys 17 and 18 which are here shown as on the shafts 19 and 20 respectively of the master and auxiliary motors 3 and 4. The springs 21 and 22 serve the double purpose of holding the rock levers in their neutral position with the rheostat arm 13 in its neutral position and also of maintaining a slight tension on the pulley belt 16.

The operation of the device is as follows:

When the auxiliary motor 4 is running at a predetermined speed with respect to the speed of the master motor 3, the rock levers 6 and 7 and the rheostat arm 13 flexibly connected thereto are held in their neutral positions. Should the auxiliary motor start to run "ahead" or "behind" the additional pull on the belt in the one or the other direction will cause the rock levers to move, thereby causing the rheostat arm 13 to move along its contacts in one or the other direction from its neutral position, thereby causing the auxiliary motor 4 to "slow down" or "speed up" to its predetermined relative speed with respect to the master motor 3.

It will thus be seen that I have provided means operated by variations in the speed of the auxiliary motor for controlling a rheostat to bring the auxiliary motor back to its predetermined speed with respect to the master motor, said means being very simple and inexpensive as well as capable of operation by very slight relative variations in speed of the auxiliary motor with respect to the master motor.

It is evident that various changes may be resorted to in the construction, form and arrangement of the several parts without departing from the spirit and scope of my invention, hence I do not wish to be limited to the particular embodiment herein shown and described, but

What I claim is:—

1. A voltage control generator, a master motor, an auxiliary motor, a rheostat and mechanical means operated by variations in the speed of the auxiliary motor for controlling the rheostat to bring the auxiliary motor back to its predetermined relative speed with respect to the master motor, said means comprising a sprocket on the shaft of the rheostat arm, a pair of coacting rock levers located between the auxiliary motor and rheostat, a chain on said sprocket having its depending ends connected to their respective rock levers, pulleys on the rock levers and on the shafts of said motors and a belt passing around all of said pulleys whereby the variations in the speed of the auxiliary motor will exert a pull on the belt sufficient to rock said levers and rheostat contact arm out of their neutral positions.

2. A voltage control generator, a master motor, an auxiliary motor, a rheostat and mechanical means operated by variations in the speed of the auxiliary motor for controlling the rheostat to bring the auxiliary motor back to its predetermined relative speed with respect to the master motor, said means comprising a sprocket on the shaft of the rheostat arm, a pair of coacting rock levers between the auxiliary motor and rheostat, a chain on said sprocket having its depending ends connected to their respective rock levers, pulleys on the rock levers and on the shafts of said motors and a belt passing around all of said pulleys whereby the variations in the speed of the auxiliary motor will exert a pull on the belt sufficient to rock said levers and rheostat contact arm out of their neutral positions and spring means serving the double purpose of yieldingly maintaining the rock levers and rheostat contact arm in their neutral positions and of maintaining a slight tension on said belt.

In testimony, that I claim the foregoing as my invention, I have signed my name this 26th day of June, 1929.

CALVERT B. COTTRELL, 3RD.